US012021295B2

(12) United States Patent
Yousefbeiki et al.

(10) Patent No.: US 12,021,295 B2
(45) Date of Patent: Jun. 25, 2024

(54) GLAZING UNIT WITH ANTENNA UNIT

(71) Applicants: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

(72) Inventors: Mohsen Yousefbeiki, Gosselies (BE); Michaël Demeyere, Forville (BE)

(73) Assignees: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 244 days.

(21) Appl. No.: 17/424,283

(22) PCT Filed: Jan. 31, 2020

(86) PCT No.: PCT/EP2020/052387
§ 371 (c)(1),
(2) Date: Jul. 20, 2021

(87) PCT Pub. No.: WO2020/157253
PCT Pub. Date: Aug. 6, 2020

(65) Prior Publication Data

US 2022/0158323 A1 May 19, 2022

(30) Foreign Application Priority Data

Jan. 31, 2019 (EP) .................................... 19154765

(51) Int. Cl.
*H01Q 1/12* (2006.01)
*H01Q 1/00* (2006.01)
(Continued)

(52) U.S. Cl.
CPC ........... *H01Q 1/1271* (2013.01); *H01Q 1/002* (2013.01); *H01Q 1/007* (2013.01); *H01Q 1/02* (2013.01); *H01Q 1/44* (2013.01); *H01Q 3/30* (2013.01)

(58) Field of Classification Search
CPC ........ H01Q 1/002; H01Q 1/02; H01Q 1/1271; H01Q 1/38; H01Q 1/007; H01Q 1/44; H01Q 3/30
See application file for complete search history.

(56) References Cited

U.S. PATENT DOCUMENTS 5,760,744 A * 6/1998 Sauer .................. H01Q 9/0407
343/700 MS
8,350,766 B2 * 1/2013 Hisaeda .................. H01Q 1/38
343/704
(Continued)

FOREIGN PATENT DOCUMENTS

| | | | |
|---|---|---|---|
| EP | 1 559 167 | A1 | 8/2005 |
| JP | 2002-246817 | A | 8/2002 |
| WO | WO 2019/017628 | A1 | 1/2019 |

OTHER PUBLICATIONS

International Search Report dated Mar. 20, 2020 in PCT/EP2020/052387 filed on Jan. 31, 2020.

*Primary Examiner* — Awat M Salih
(74) *Attorney, Agent, or Firm* — Oblon, McClelland, Maier & Neustadt, L.L.P.

(57) ABSTRACT

A glazing unit including a glass panel and an antenna unit. The antenna unit includes an antenna, a fixing portion for fixing the antenna to the glass panel at a distance d depending on the frequency so that a space S through which air can flow is formed between the glass panel and the antenna.

11 Claims, 6 Drawing Sheets

(51) Int. Cl.
*H01Q 1/02* (2006.01)
*H01Q 1/44* (2006.01)
*H01Q 3/30* (2006.01)

(56) References Cited

U.S. PATENT DOCUMENTS

| | | | | |
|---|---|---|---|---|
| 11,322,818 | B2 * | 5/2022 | Kum | H01Q 15/02 |
| 2003/0112187 | A1 | 6/2003 | Whitehouse | |
| 2006/0202897 | A1 | 9/2006 | Roquiny | |
| 2020/0161741 | A1 * | 5/2020 | Hiramatsu | H01Q 1/1271 |

* cited by examiner

GLAZING UNIT WITH ANTENNA UNIT

TECHNICAL FIELD

The present invention relates to a glazing unit with an improved antenna unit.

BACKGROUND ART

Various communication systems based on wireless technologies such as cellular communication, radio broadcasting, GPS (Global Positioning System) are being developed. In order to deal with these communication systems, an antenna capable of transmitting and receiving electromagnetic waves used for each communication system is required.

In recent years, with miniaturization, antennas are increasingly installed in buildings. A large number of antennas are installed in the building so that electromagnetic waves used for mobile communications can be transmitted and received in a stable manner. When installing the antenna in the building, it is necessary to select the proper placement of the antenna so that electromagnetic waves can be transmitted and received stably while preventing the appearance of the building from being impaired.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to install a larger number of antennas in order to stably perform electromagnetic wave transmission and reception It is said.

As an antenna unit to be installed and used in a building, for example, there are three layers having different relative dielectric constants, each layer is set to a predetermined thickness, and a radio wave transmitting body as described in the patent application JP06196915.

However, according to the technique described in JP06196915, there is a case where the temperature of the first layer excessively rises when the sunlight hits the first layer, depending on the installation place or the installation condition of the antenna unit and the like, It has not been studied that there is a possibility of thermal cracking in the first layer of the permeable member.

Thus, the antenna is placed behind glazing panel. Glazing composition can be different from building to another building in terms of the number of glass or interlayer panels, their thickness, the spacing, . . . . For some glazing compositions, the incident wave cannot effectively pass through the glazing since for a considerable part of the frequency spectrum significant amount of the wave radiated by the antenna is reflected back at the first interface.

Often it is desired to maximize the transmission of the main beam through the glazing while reducing the back reflection. In this case, the antenna design almost becomes independent of the glazing onto which the antenna will be attached.

A solution is adding a matching layer between the antenna and the glazing panel to reduce the degradation of the antenna pattern. However, this layer design is very specific to the antenna type and specifications. Therefore, it adds complexity in design as well as in installation.

To maximize the transmission of the wave radiated from the antenna through the glazing and to reduce the back reflection while avoiding the complexity of the design of the matching layer, the antenna is needed to be placed in a specific distance from the glazing interface to enable Fabry-Perot resonant phenomenon between the glazing and the antenna. This optimum distance depends on operating frequency, composition/assembly of the glazing panel and on the material of glazing panel.

An object of one embodiment of the present invention is to provide a glass antenna unit capable of reducing the possibility of occurrence of thermal cracking in a glass panel while maximizing the transmission of the wave radiated from the antenna through the glazing and reducing the back reflection.

SUMMARY OF INVENTION

It is an object of the present invention to alleviate these problems, and to provide a glazing unit which leads to decrease the possibility of occurrence of thermal cracking in the glass panel while maximizing the transmission of the wave radiated from the antenna unit through the glazing and thus reducing the back reflection to be able to offer an system as generic as possible.

According to a first aspect of the invention, the invention relates to an improved glazing unit extending along a plane, P, defined by a longitudinal axis, X, and a vertical axis, Z; having a width, W, measured along the longitudinal axis, X, and a length, L, measured along the vertical axis, Z, comprising at least a glass panel and an antenna unit.

The solution as defined in the first aspect of the present invention is based on the antenna unit comprises a planar-like antenna, a fixing portion for fixing the antenna to the glass panel with a distance $$d_{opt} = \frac{c_0}{4f}\left(1 + \frac{\varphi_{ref,1}}{\pi}\right)$$

with the condition $$\frac{C_0}{4f} < d_{opt} < \frac{3C_0}{4f}$$

where $0<\varphi_{ref,1}<2\pi$ where $c_0$ is speed of light at free space, f is the working frequency, d is the distance between the antenna and the glazing panel, $\varphi_{ref,1}$ is the phase of reflection from the air-glazing panel interface so that a space through which air can flow is formed between the glass panel and the antenna.

According to the invention, the glass panel comprises at least a first glass sheet.

According to the invention, the glass panel comprises at least a second glass sheet separated from the first glass sheet by a spacer to improve the thermal performances of the glazing unit. The space between these two glass sheets is fill with gas such as argon to improve the thermal insulation of the glazing unit.

In some embodiments, the glazing unit comprises at least a second glass sheet assembled with the first glass sheet by a plastic interlayer.

In preferred embodiments, the inner surface of the first glass panel is at least partially cover by a coating system to improve the thermal insulation of the glazing unit and preferably, the coating system has an opening in front of the antenna unit.

In preferred embodiments, the antenna is an array of antennas.

In some more preferred embodiments, the antenna is narrow band antenna.

In some embodiments, the fixing portion comprises a detachable fastening mean for attaching and/or detaching the antenna from the glass panel.

The invention relates also to a method to produce a glazing panel according to a first aspect of the invention and a method to produce a glazing unit extending along a plane, P, defined by a longitudinal axis, X, and a vertical axis, Z; having a width, W, measured along the longitudinal axis, X, and a length, L, measured along the vertical axis, Z, comprising at least a glass panel, facing outside having two majors surfaces extending along a plane, P, an outer surface and an inner surface and antenna unit (10) comprising a fixing portion and a planar-like antenna.

According to the invention, the method comprises a step where a reflected signal is measured between the glass panel and the antenna to adjust the distance.

It is noted that the invention relates to all possible combinations of features recited in the claims.

The following description relates to a building window unit but it's understood that the invention may be applicable to others fields like transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
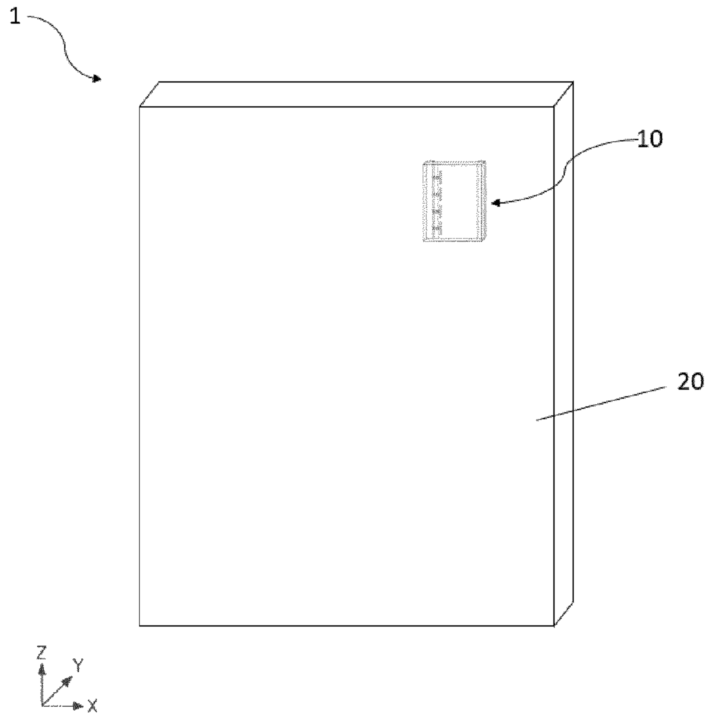
FIG. 1 is a schematic view of a glazing unit according to an exemplifying embodiment of the present invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the glass panel is defined as the X direction, the thickness direction is defined as the Y direction, and the height is defined as the Z direction. The direction from the bottom to the top of the glass panel is defined as the +Z axis direction, and the opposite direction is defined as the −Z axis direction. In the following description, the +Z axis direction is referred to as upward and the −Z axial direction may be referred to as down.

With reference to FIG. 1, a first embodiment of the present invention is described.

As shown in FIG. 1, a glazing unit 100 comprises a glass panel 1, comprising an outer surface 1A and an inner surface 1B, and an antenna unit 10. The antenna unit 10 is attached to the inner surface 1B on the indoor side of the glass panel 1. Then, sunlight or the like is irradiated on the outer surface 1A of the glass panel 1 on the side opposite to the interior side.

In some embodiments, the glass panel comprises at least one glass sheet (first glass sheet).

In some preferred embodiments, the glass panel comprises at least two glass sheets separated by a spacer allowing to create a space filled by a gas like Argon to improve the thermal isolation of the glass panel, creating an insulating glazing panel. It means that, in these embodiments, the antenna unit is placed outside of the insulating glazing panel on the glass face the most far from the outside face where the sun is directly heating.

The glass panel 1 is a known glass plate used for a window of a building or the like. The glass panel 1 is formed in a rectangular shape in plan view and has a first main surface and a second main surface. The thickness of the glass panel 1 is set according to requirements of buildings and the like.

In some embodiments, the outer surface 1A of the glass panel 1 is set to the outdoor side and the inner surface 1B is set to the indoor side (facing the antenna 12).

In the present embodiment, the first main surface and the second main surface are collectively referred to simply as the main surface in some cases. In the present embodiment, the rectangle includes not only a rectangle or a square but also a shape obtained by chamfering corners of a rectangle or a square. The shape of the glass panel 1 in a plan view is not limited to a rectangle, and may be a circle or the like. Further, the glass panel 1 is not limited to a single plate, and it may be a laminated glass or a double-layered glass.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

As the material of the glass panel 1, for example, soda-lime silica glass, borosilicate glass, or aluminosilicate glass can be mentioned.

The glass panel 1 can be manufactured by a known manufacturing method such as a float method, a fusion method, a redraw method, a press molding method, or a pulling method. As a manufacturing method of the glass panel 1, from the viewpoint of productivity and cost, it is preferable to use the float method.

The glass panel 1 can be formed in a rectangular shape in a plan view by using a known cutting method. As a method of cutting the glass panel 1, for example, a method in which laser light is irradiated on the surface of the glass panel 1 to cut the irradiated region of the laser light on the surface of the glass panel 1 to cut the glass panel 1, or a method in which a cutter wheel is mechanically cutting can be used.

The glass sheet can be a clear glass or a coloured glass, tinted with a specific composition of the glass or by applying a coating or a plastic layer for example.

In order to minimize the heat inside the building and inside the space S between the antenna 12 and the glass panel 1, the glass panel 1 may be provided with a coating layers system having a heat ray reflecting function and the like on the second main surface on the interior side of the glass panel 1.

In this embodiment, the coating layers system preferably has an opening at a position facing the antenna unit of the antenna unit 10. Thereby, the glass panel with an antenna can suppress deterioration of the radio wave transmission performance.

The opening can be a surface without the coating layers system or a plurality of small slits or any shape in the coating layers system to become a frequency selective surface in order to let waves pass from one side to the other side of the glass panel to further suppress deterioration of radio wave transmission performance.

As the coating layers system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

The glass sheet can be processed, ie annealed, tempered, . . . to respect with the specifications of security and anti-thief requirements. A heatable system, for example a coating or a network of wires, can be applied on the glazing unit to add a defrosting and/or a demisting function for example.

In case of several glass sheets, in some embodiments, each glass sheet can be independently processed and/or coloured, . . . in order to improve the aesthetic, thermal insulation performances, safety, . . .

Figure 3:
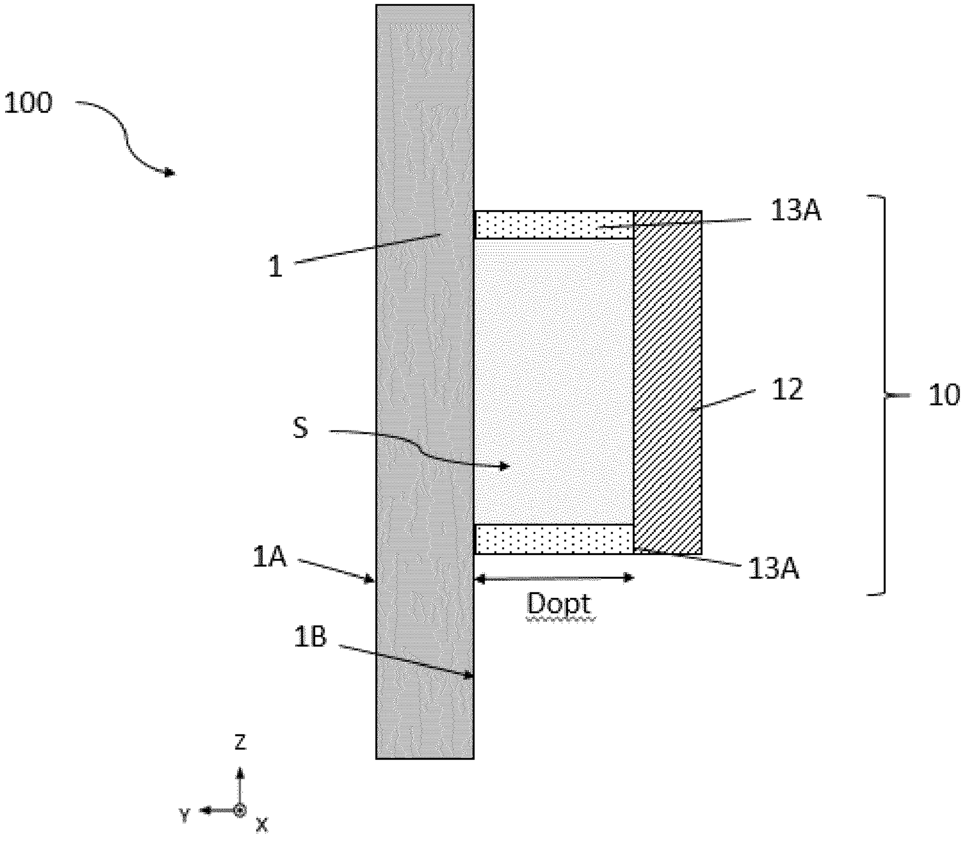
FIG. 3 is a schematic sectional view of an insulating glazing unit according to an exemplifying embodiment of the present invention.

As shown in FIG. 3, in some preferred embodiments, the antenna 12, is a planar antenna like microstrip patch antenna or slot antenna for example, the radiation from radiating element is often normal to the antenna plane independent of the antenna polarization. This could be the case for antenna arrays with a tilted beam where beam-shaping is often attained by changing the excitation phase of each radiating element. Therefore, the main beam of each radiating element is normal to the surface of the antenna or the glazing panel, as the antenna is preferably substantially parallel to the glazing panel, by considering normal incidence ($\theta_i=0$) of TE mode.

Preferably, to avoid detuning of antenna impedance response when placed in proximity of the glazing due to dielectric loading, a minimum distance of preferably quarter wavelength $$\left(\frac{c_0}{4f}\right)$$

should be considered.

Surprisingly, the minimum distance to have maximum wave transmission can be calculated as $$d_{opt} = \frac{c_0}{4f}\left(1 + \frac{\varphi_{ref,1}}{\pi}\right)$$

while $0<\varphi_{ref,1}<2\pi$ which gives the distance $d_{opt}$ in a range $$\frac{C_0}{4f} < d_{opt} < \frac{3C_0}{4f}$$

where

- $c_0$ is speed of light at free space,
- f is the working frequency,
- d is the distance between the antenna and the glazing panel and
- $\varphi_{ref,1}$ is the phase of reflection from the air-glazing panel interface and could be calculated from Fresnel's formulas.

Preferably, to avoid detuning of antenna impedance response when placed in proximity of the glazing due to dielectric loading, a minimum distance of preferably quarter wavelength $$\left(\frac{c_0}{4f}\right)$$

should be considered and reflection condition is still satisfied when the antenna is placed multiples of half wavelength $$\left(\frac{c_0}{2f}\right)$$

further from the distance $D_{opt}$.

The phase of reflection from the air-glazing panel interface $\varphi_{ref,1}$ is calculated from application of Fresnel's reflection and transmission coefficients for a normal incidence to the multilayer glazing structure composed of glass, interlayer, and coating layers.

Figure 2:
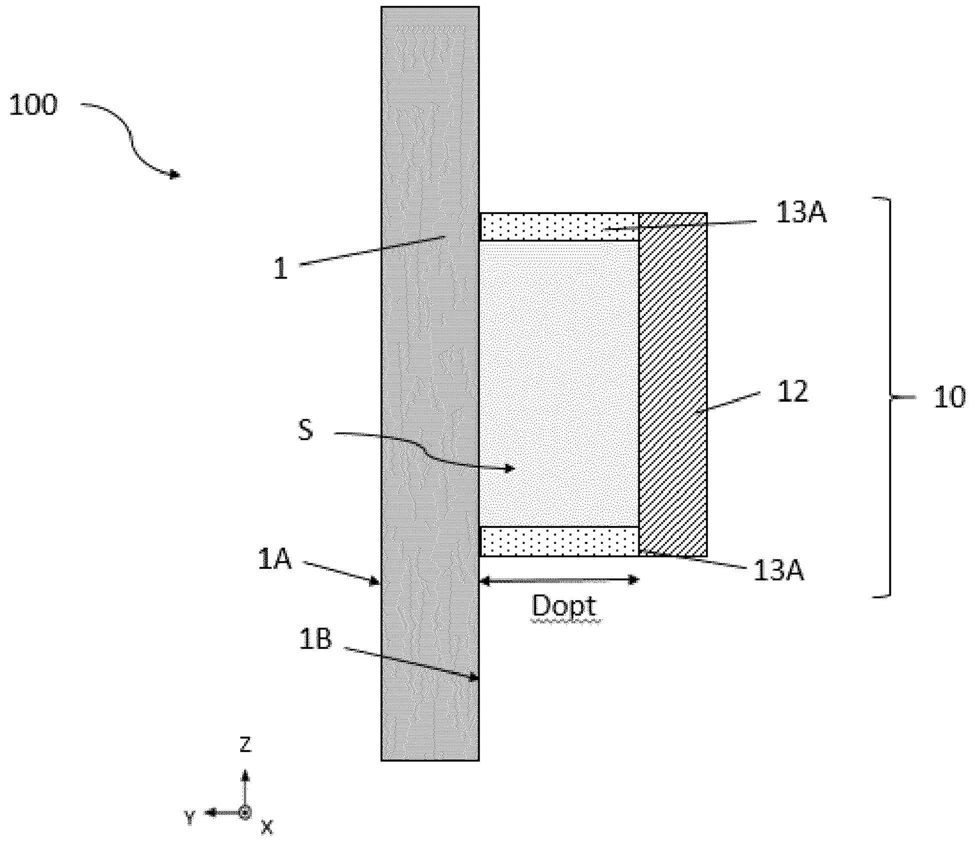
FIG. 2 is a schematic sectional view of an insulating glazing unit according to an exemplifying embodiment of the present invention.

As shown in FIG. 2, the antenna unit 10 comprises a fixing portion 13A for fixing the antenna 12 to the glass panel with a distance $$d_{opt} = \frac{c_0}{4f}\left(1 + \frac{\varphi_{ref,1}}{\pi}\right)$$

with the condition $$\frac{C_0}{4f} < d_{opt} < \frac{3C_0}{4f}$$

where $0<\varphi_{ref,1}<2\pi$ so that a space S through which air can flow is formed between the glass panel 1 and the antenna 12 while creating a Fabry-Perot resonance structure between the glass panel 1 and the antenna 12 such that forward waves 21 and 24 to be in-phase.

In addition, the glazing unit 1 can be assembled within a frame or be mounted in a double skin facade or any other means able to maintain a glazing unit.

According to some embodiments according to the invention, the planar-like antenna 12 can be a flat plate-like substrate on which the antenna 12 is provided. For instance, the antenna 12 can be a planar antenna like the microstrip patch array, slot array, a dipole antenna, an array of antennas, or the like can be used.

As the metal material forming the antenna 12, a conductive material such as gold, copper, nickel or silver can be used.

According to the invention, the antenna 12 may radiate in the direction of outside (−Y), meaning to the direction of the glass panel, in the direction of inside (+Y), meaning to the opposite direction of the glass panel or in both directions (+Y, −Y).

In some embodiments, the antenna 12 can be provided on a first main surface of the antenna installation substrate. The antenna 12 can be formed by printing a metal material so as to at least partially overlap a ceramic layer provided on the second main surface of the antenna installation substrate. In that embodiment, the antenna 12 is provided on the second main surface of the antenna installation substrate so as to straddle the portion where the ceramic layer is formed and the other portion.

In this embodiment, the ceramic layer can be formed on the second main surface of the antenna installation substrate by a known method such as printing. By providing the ceramic layer, the wiring (not shown) attached to the antenna 12 can be covered or hidden to have a better finish and/or design. Further, in the present embodiment, the ceramic layer is formed on the first main surface but may not be provided.

In the present embodiment, the antenna 12 is provided on the first main surface of the antenna installation substrate, but may be provided inside the antenna installation substrate. In this case, for example, the antenna 12 can be provided inside the antenna installation board in the form of a coil. Further, the antenna 12 itself may be formed in a flat plate shape. In this case, instead of using the antenna mounting board, a flat plate antenna may be directly attached to the fixing portion 13A. The antenna 12 may be provided inside the accommodation container having a surface parallel to the glass panel 1, in addition to being provided on the antenna installation substrate 12. In this case, in the antenna 12, for example, a flat antenna can be provided inside the storage container.

The antenna 12 preferably has optical transparency to be has discrete as possible. If the antenna 12 has optical transparency, the average solar radiation absorption rate can be lowered on top of the hidden effect.

Preferably, the antenna 12 or the antenna installation substrate is provided in substantially parallel to the glass panel 1. The antenna 12 or the antenna installation substrate can be formed in a rectangular shape in a plan view and has a first main surface and a second main surface. The first main surface is provided so as to face the main surface of the glass panel 1 to be attached and the second main surface is provided in a direction opposite to the main surface side of the glass panel 1.

In some embodiments, the material for forming the antenna installation board is designed according to the antenna performance such as power and directivity required for the antenna 12, and for example, glass, resin, metal, or the like can be used. The antenna installation substrate may be formed to have light transmittance by resin or the like. Since the antenna mounting board 12 is made of a light transmissive material, the glass panel 1 can be seen through the antenna installation board 12, so that it is possible to reduce the obstruction of the field of view seen from the glass panel 1.

The thickness of the antenna installation board can be designed according to the place where the antenna 12 is arranged.

The fixing portion 13A is for forming a space S through which air can flow between the glass panel 1 and the antenna 12 and is for fixing the antenna 12 to the glass panel 1. The fixing portion 13A is attached to the first main surface of the antenna installation substrate 12. In the present embodiment, the fixing portion 13A is provided in a rectangular shape along the Z-axis direction at both ends in the X-axis direction of the antenna installation substrate. In the present embodiment, the reason why the space S through which air flows is formed between the glass panel 1 and the antenna 12 is that the local temperature of the surface temperature of the glass panel 1 at the position facing the antenna 12. When the outer main surface of the glass panel 1 is irradiated with sunlight, the glass panel 1 is heated. At this time, if the flow of air is blocked in the vicinity of the antenna unit 10, the temperature of the antenna unit 10 rises, so that the temperature of the surface of the glass panel 1 to which the antenna unit 10 is attached is higher than the temperature of the other surface The temperature tends to rise more easily. In order to suppress this temperature rise, a space S is formed between the glass panel 1 and the antenna 12. Details regarding this point will be described later.

The material for forming the fixing portion 13A is not particularly limited as long as it can be fixed to the contact surface of the antenna 12 and the glass panel 1. For example, an adhesive or an elastic seal can be used. Materials for forming adhesives and sealing materials.

In some embodiments, the fixing portion can be transparent meaning with a light transmission of at least 30%, preferably at least 50% and more preferably at least 65%.

If the average thickness of the fixing portion 13A is too small, the thickness of the space S formed by the antenna 12 and the glass panel 1 becomes small (thin), and the air does not smoothly flow through the space S. By making the space S between the antenna 12 and the glass panel 1 slight, the thickness of the space S becomes thin, but the space S can function as a heat insulating layer. Even if the thickness of the space S is small, a certain amount of air flows. That is, when sunlight is irradiated on the glass panel 1, the temperature of the glass panel 1 rises, and the temperature of the air in the space S also rises. As the temperature of the air rises, the air expands more, so that the upper air in the space S rises and flows out from the upper side of the space S to the outside. Then, the air sequentially rises from the lower side in the space S. Therefore, even when the thickness of the space S is small, the air tends to flow as the temperature of the air in the space S rises.

On the other hand, when the average thickness of the fixing portion 13 A is increased, the space S is increased (thickened) by that much, so that the air flow in the space S is preferable. However, since the distance between the main surface of the glass panel 1 and the antenna 12 increases (increases), there is a possibility that the electromagnetic wave transmission performance may be hindered. Further, since the antenna unit 10 protrudes largely from the main surface of the glass panel 1, the antenna unit 10 becomes an obstacle to the glass panel 1.

Surprisingly, distance $d_{opt}$, corresponding to the thickness of the fixing portion 13A, is an optimized distance also for the air flow in space S.

Although the embodiment in which the fixing portion 13 A is provided at two locations of the antenna 12 has been described so far, the mode of the fixing portion 13A is not limited as long as the air can flow in the space S. According to the invention, the fixing portion can have another form. According to the invention, for example, the fixing portion is provided at both ends in the X-axis direction of the first main surface of the antenna 12 and at both ends in the Z-axis direction, respectively, and the antenna 12 is fixed to the glass panel with four fixing portions Further, among the four fixing portions, only one fixing portion provided in the −Z axis direction is provided at the lower end of the antenna installation substrate 12, for example, near the center, and the antenna installation substrate 12 is fixed to the glass panel 1 by three It may be fixed by the portion. It is understood that a plurality of small fixing elements can be used instead of long fixing elements.

According to the invention, the average thickness of the fixed portion 13A is corresponding to the distance $d_{opt}$, the air flowing into the space S can pass through the space S due to a slight increase in temperature. As a result, the glass panel 1 can be prevented from being heated by the air flowing in the space S, so that excessive temperature rise of the antenna 12 can be suppressed.

In the present embodiment, the thickness refers to the length in the vertical direction (Y axis direction) of the fixed portion 13A with respect to the contact surface of the antenna 12 and the glass panel 1. In the present embodiment, the average thickness t of the fixed portion 13A is an average value of the thickness of the fixed portion 13A. For example, when measured in several places (for example, about three places) at an arbitrary place in the Z axis direction in the cross section of the fixed part 13A, it means the average value of the thicknesses of these measurement points.

As described above, the space S is formed between the glass panel 1 and the antenna 12 by the fixing portion 13A and allows air to flow. Therefore, the thickness of the space S is substantially the same as the average thickness t of the fixed portion 13A.

In the antenna unit 10, air flows into the space S from the lower side (−Z axis direction) of the antenna 12. The air flowing into the space S can freely flow in the space S toward the upper side (+Z axis direction) of the antenna 12. The air flowing through the space S flows out from the upper side (+Z axis direction) of the antenna 12 while contacting the main surface of the glass panel 1 at a position facing the antenna 12. By contacting the air in the space S with the main surface of the glass panel 1 at a position facing the antenna 12, the main surface of the glass panel 1 at the position facing the antenna 12 is exposed to outside air and the sun excessive temperature rise due to light etc. is suppressed. In addition, since the fixing portion 13A is continuously formed in the vertical direction, the temperature difference between the upper portion and the lower portion in the space S is increased accordingly. Therefore, due to the so-called chimney effect, the flow velocity of the air flowing in the space S can be increased.

In the antenna unit 10, a fixing portion 13 A is provided on the antenna 12 so that a space S through which air can flow is formed between the glass panel 1 and the antenna 12. Thus, even if the glass panel 1 is heated by outside air, sunlight, or the like, excessive temperature rise of the main surface of the glass panel 1 at the position facing the antenna 12 can be suppressed. Therefore, it is possible to reduce the possibility of occurrence of thermal cracks in the glass panel 1 at the position facing the antenna 12. Therefore, the antenna unit 10 can be stably installed on the glass panel 1 without causing damage to the glass panel 1.

The non-fixing portion is portion of the antenna unit not in contact with the glass panel 1 allowing the air to flow though compared to the fixing portion.

In some embodiments, the fixing portion can let air flows by using holes, small elements instead of large ones, . . .

The antenna unit 10 is preferably provided at a position separated from the glass panel 1 by a predetermined distance $d_{opt}$ in plan view. This distance is dependant of the frequency of the wanted radiation from the antenna. For example, when the glass sheet is directly exposed to the sunlight, the temperature of the glass panel 1 rises to a high temperature. In some cases, there is a possibility that thermal cracks may occur in the portion of the glass panel or the vicinity thereof located at the position facing the antenna unit 10. In particular, by attaching the antenna unit 10 to the second main surface of the glass panel 1, the flow of air on the second main surface of the glass panel 1 at a position facing the antenna unit 10 is hindered. In this case, the temperature of the portion of the glass panel 1 located opposite the antenna unit 10 is further increased. As a result, there is a possibility that the thermal distortion occurring in the portion of the glass panel 1 at the position facing the antenna unit 10 or in the vicinity thereof may be further increased.

Figure 5A:
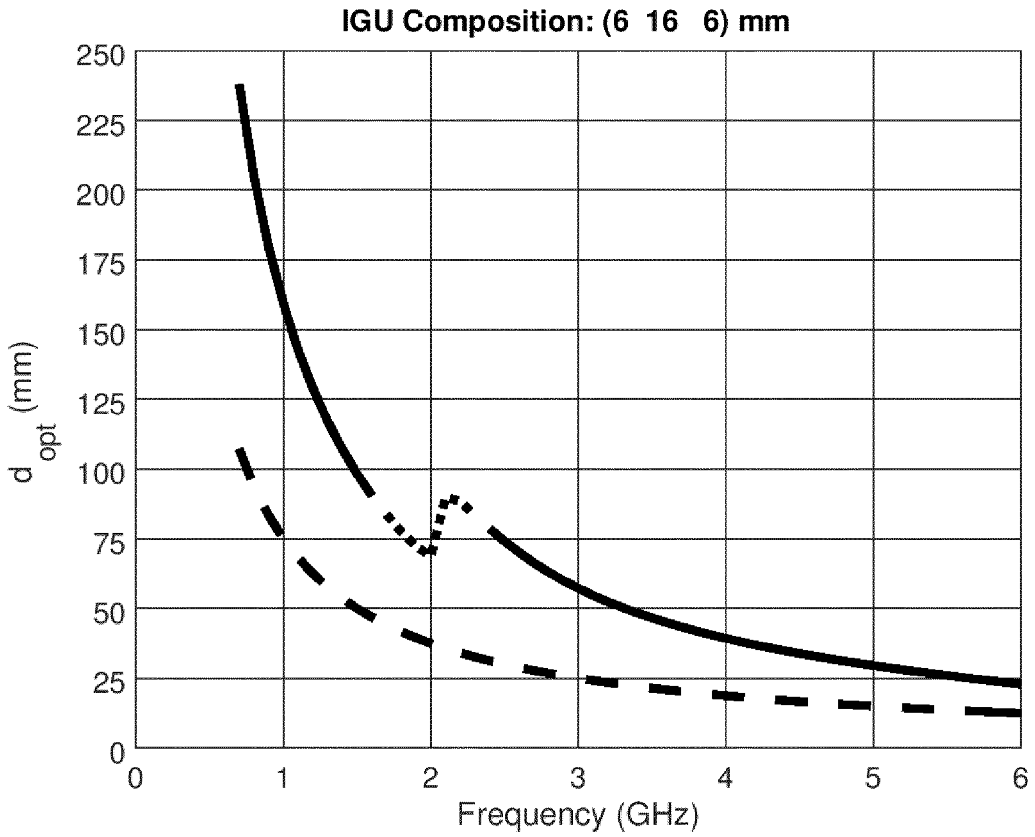
FIG. 5A is a diagram showing a simulation result of the distance $d_{opt}$ depending of the frequency for a second example according to the invention.
Figure 5B:
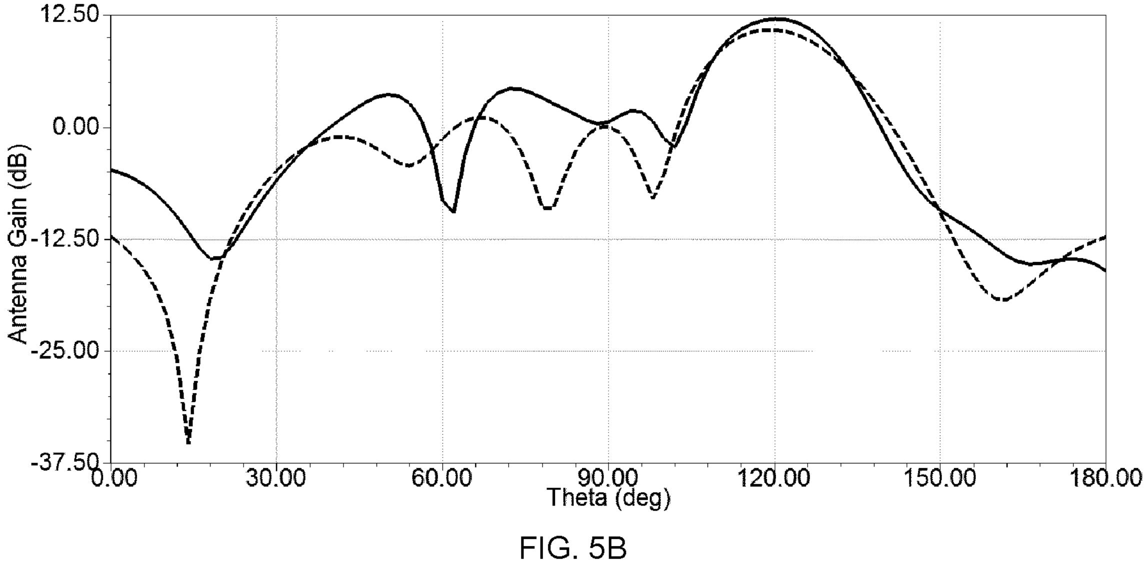
FIG. 5B is a diagram showing a simulation result of the antenna gain ([dB]) for a second example according to the invention.
Figure 6:
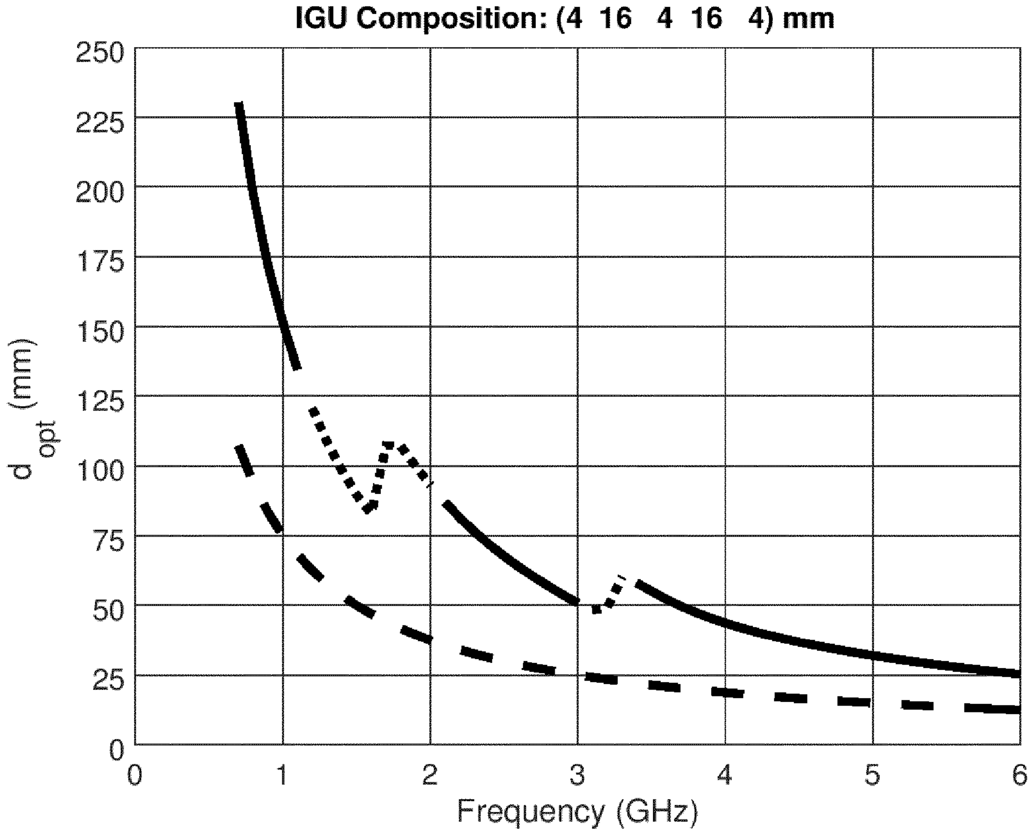
FIG. 6 is a diagram showing a simulation result of the distance $d_{opt}$ depending of the frequency for a third example according to the invention.

FIGS. 4 to 6 show the distance $d_{opt}$ depending on the frequency for certain non-limited embodiments. These examples comprise an antenna unit 10 with a planar-like antenna. It is understood that according to the invention, the glazing panel may comprises more than one antenna unit.

Figure 4A:
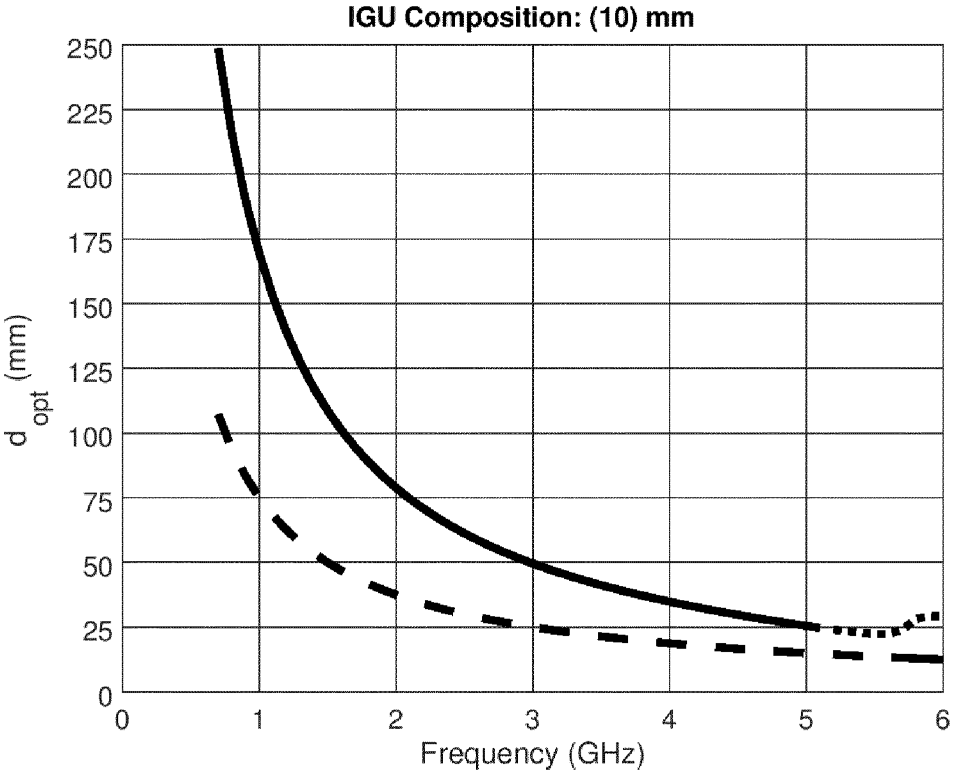
FIG. 4A is a diagram showing a simulation result of the distance $d_{opt}$ depending of the frequency for a first example according to the invention.

FIGS. 4A, 5A and 6 represent a diagram showing a simulation result of the distance $d_{opt}$ (solid curve) depending of the frequency for different glazing panel configurations according to different examples where the dashed curve represents the quarter wavelength.

Figure 4B:
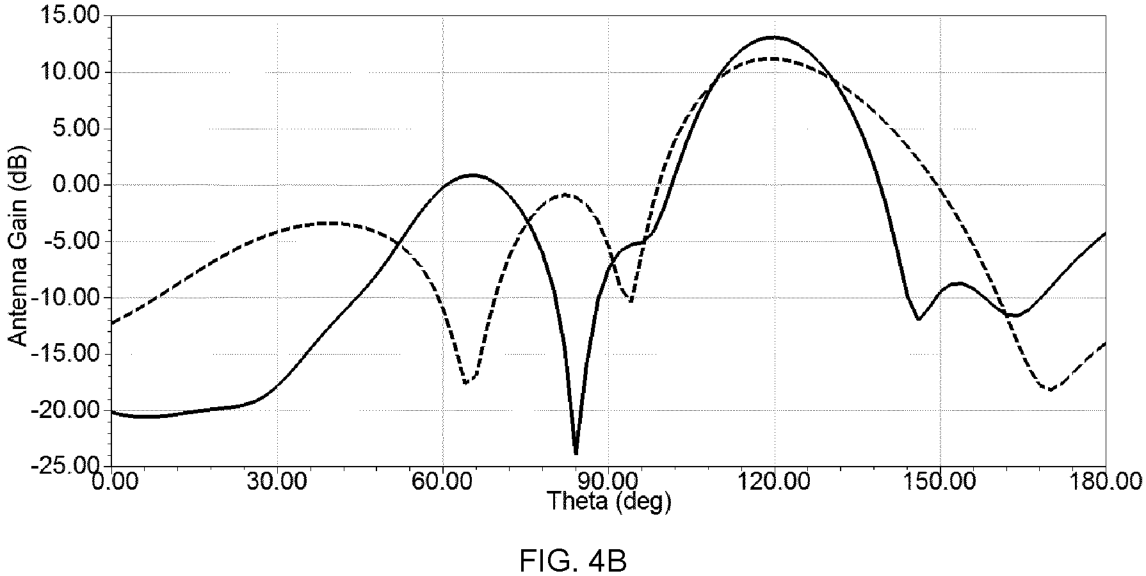
FIG. 4B is a diagram showing a simulation result of the antenna gain ([dB]) for a first example according to the invention.

FIGS. 4B and 5B represent a diagram showing a simulation result of the antenna gain ([dB]) for different glazing panel configurations according to different examples where the solid curve represents antenna gain pattern at the distance $d_{opt}$ from the glazing; the dashed curve represents the antenna gain pattern in free space and where Theta represents the angle between the z-axis and y-axis.

The glazing panel configuration of the first example is a single glass sheet of 10 mm thick (in Y axis) where for H-polarized antenna array with 30-deg down-tilt beam at 3.6 GHz.

For this particular frequency (3.6 GHz), the distance $d_{opt}$ is at 40 mm when $d_{opt}$ is 169 mm to maximize radiation from an antenna radiating at 1 GHz and $d_{opt}$ is 25 mm to maximize radiation from an antenna radiating at 5 GHz as shown in FIG. 4A.

The gain shown in FIG. 4B is for an antenna radiating at 3.6 GHz. In this first example, the maximum transmitted radiation (radiation through the glazing panel) is achieved with a minimum distortion.

The glazing panel configuration of the second example is two glass sheets of 6 mm thick (in Y axis) separated by a spacer of 16 mm where for V-polarized antenna array with 30-deg down-tilt beam at 3.6 GHz.

For this particular frequency (3.6 GHz), the distance $d_{opt\ is\ at}$ 45 mm when $d_{opt}$ is 159 mm to maximize radiation from an antenna radiating at 1 GHz and $d_{opt}$ is 30 mm to maximize radiation from an antenna radiating at 5 GHz as shown in FIG. 5A.

The gain shown in FIG. 5B is for an antenna radiating at 3.6 GHz. In this second example, the maximum transmitted radiation (radiation through the glazing panel) is achieved with a minimum distortion.

The glazing panel configuration of the third example is three glass sheets of 4 mm thick (in Y axis) where each glass sheet is separated from another one by a spacer of 16 mm and where for H-polarized antenna array with 30-deg down-tilt beam at 3.6 GHz.

For this particular frequency (3.6 GHz), the distance $d_{opt}$ is at 50 mm when $d_{opt}$ is 151 mm to maximize radiation from an antenna radiating at 1 GHz and $d_{opt}$ is 32 mm to maximize radiation from an antenna radiating at 5 GHz as shown in FIG. 6.

The back reflection of the glass panel 1 is significantly reduced for an antenna unit 10 according to the invention while distortions of the transmitted radiation is minimized.

Since the glass panel 1 is provided with the antenna unit 10, it is possible to reduce the possibility of occurrence of thermal cracks in the portion of the glass panel 1 located opposite the antenna unit 10 while minimizing the back reflection of the glass panel 1 especially in the portion of the glass panel located opposite the antenna unit 10. Therefore, the glass panel 1 with an antenna can be suitably used as a glass panel for a window glass of existing or new buildings, houses and the like.

As the antenna unit is place in the inside surface of the glazing panel, it is possible to prevent the antenna unit 10 from damaging the external appearance of the building, and it is possible to prevent the antenna unit 10 from being exposed to the outside air, so that the durability can be improved. Furthermore, in the glass panel 1 with an antenna unit 10, the antenna unit 10 is provided on the upper side of the glass panel 1 and on either one of the left and right sides. Therefore, by passing the wiring connected to the antenna of the antenna unit 10 from the glass panel to the ceiling back side, the wall, etc., it is possible to reduce the number of wires exposed to the glass panel 1 and the wall inside the building interior it can.

Further, since the antenna unit 10 is provided on the glass panel 1, there is no need to provide the glass panel 1 with the antenna on the roof of the building or the like. Therefore, since the glass panel 1 with an antenna can be made unnecessary for installation at a high place such as the roof of a building, it can be easily installed in a building. Further, for example, even when the antenna unit 10 is broken and needs to be replaced, the antenna unit 10 can be replaced easily in a short time.

As far as the operations frequency of the antenna and the composition of the glazing panel are known, then the antenna can be fixed at the optimal distance. And if the operations frequency of the antenna changes, this distance can be adapted.

In some embodiments, the fixing portion comprises a detachable fastening mean for attaching and/or detaching the antenna from the glass panel allowing detach the antenna in order to facilitate the handling, the maintenance, the replacement of the antenna and/or the glass panel.

These embodiments allow also to adapt the distance between the glass panel and the antenna by replacing only at least a part of the fixing portion, for example by changing an element of the detachable fastening mean.

According to the invention, the fixing portion may comprises a first element and a second element, the first element cooperates with the second element in order to be detachable from one to another.

The first element is assembled on the inner surface of the glass panel and the second element is assembled on the antenna.

In some embodiments, the first and/or the second element of the fixing portion can be any shape in order to cooperate together to be detachable from one to another.

One of the first and the second elements may have a hook-like shape cooperating with the other element to be detachable from one to another.

For example, the first or the second element can be a recess on the surface of the glass panel or on the surface of the antenna and the second or the first is an element cooperating the a hole.

According to the invention, the first and/or the second element of the fixing portion can be a polymer which is rigid at ambient temperature. "Polymer which is rigid at ambient temperature" is understood to mean a polymer, the glass transition temperature Tg of which is at least 50° C. Preferably, the polymer chosen has a Tg of at least 65° C. Most preferably, the polymer has a Tg of at least 80° C. Examples of such polymers are a polymethyl methacrylate (PMMA), a polycarbonate (PC), a polystyrene (PS), a polyvinyl chloride (PVC), a polyamide (PA), a polyetherimide (PEI), a polyethylene terephthalate (PET), a styrene/acrylonitrile (SAN) copolymer, a poly(acrylonitrile-co-butadieneco-styrene) (ABS) or a blend of these compounds. Preferably. the transparent and rigid polymer is chosen from a PMMA, a PC, a PS, a PVC, an ABS, a PA or a blend of these compounds or any other polymer with a light transmission of at least 30%, preferably at least 50% and more preferably at least 65% able to be structural. More preferably still, the structural element is formed from PMMA or from PC. These polymers are characterized by a high transparency and a high processability. The term "polymer" covers in this instance both polymers and copolymers.

In some embodiments to improve the adhesion of the fixing portion to the antenna and/or to the glass panel, a primer could be used.

According to another embodiment of the glazing unit, also compatible with the preceding embodiments, the first and/or the second element of the fixing portion ma comprises an transparent adhesive. The adhesive can be a glue or a transparent material consisting, for example, of a double-sided adhesive tape made of acrylic polymer, made of rubber or made of silicone, a polyisobutylene-based adhesive or an adhesive of crosslinkable acrylic or crosslinkable epoxy type. Preferably. a double-sided adhesive tape made of acrylic polymer is used.

Crosslinkable" is understood to mean the fact of forming a three-dimensional network of polymer chains under the action of ultraviolet radiation, of moisture or of a curing agent. These materials. in addition to being transparent, exhibit a good performance in terms of tightness to water vapour and gases and in addition exhibit good adhesion to the glass while withstanding ultraviolet rays.

The invention claimed is:

1. A glazing unit extending along a plane, P, defined by a longitudinal axis, X, and a vertical axis, Z; having a width, W, measured along the longitudinal axis, X, and a length, L, measured along the vertical axis, Z, comprising:

a glass panel, facing outside having two major surfaces extending along the plane, P, the two major surfaces being an outer surface and an inner surface; and an antenna unit, wherein the antenna unit comprises:

a planar-like antenna; and a fixing portion for fixing the antenna to the glass panel with a distance $d_{opt}=C_o/4f\ (1+\varphi ref,1/\pi)$ with a condition $C_o/4f<d_{opt}<3C_o/4f$ where $0<\varphi ref,1<2\pi$ so that a space through which air can flow is formed between the glass panel and the antenna, in which $C_o$ is speed of light at free space, f is a working frequency, and φref,1 is a phase of reflection from an air-glass panel interface.

2. The glazing unit according to claim 1, wherein the glass panel comprises at least a first glass sheet.

3. The glazing unit according to claim 2, wherein the glass panel comprises a second glass sheet separated from the first glass sheet by a spacer.

4. The glazing unit according to claim 2, wherein the glass panel comprises a second glass sheet assembled to the first glass sheet with a plastic interlayer.

5. The glazing unit according to claim 4, wherein the inner surface of the first glass panel is at least partially covered by a coating system.

6. The glazing unit according to claim 5, wherein the coating system has an opening in front of the antenna unit.

7. The glazing unit according to claim 1, wherein the antenna is an array of antenna.

8. The glazing unit according to claim 1, wherein the antenna is a narrow band antenna.

9. The glazing unit according to claim 1, wherein the fixing portion comprises a detachable fastening means for attaching and/or detaching the antenna from the glass panel.

10. The glazing unit according to claim 1, wherein the fixing portion is transparent with a light transmission of at least 65%.

11. A method to produce a glazing unit extending along a plane, P, defined by a longitudinal axis, X, and a vertical axis, Z: having a width, W, measured along the longitudinal axis, X, and a length, L, measured along the vertical axis, Z, comprising: a glass panel, facing outside having two major surfaces extending along the plane, P, the two major surfaces being an outer surface and an inner surface; and an antenna unit comprising a fixing portion and a planar-like antenna, the method comprising:

measuring a reflected signal between the glass panel and the antenna; and adjusting a distance $d_{opt}$ between the glass panel and the antenna such that the distance $d_{opt}$ equals $C_o/4f(1+\varphi ref,1/\pi)$ with a condition $C_o/4f<d_{opt}<3C_o/4f$ where $0<\varphi ref,1<2\pi$ so that a space through which air can flow is formed between the glass panel and the antenna, in which $C_o$ is speed of light at free space, f is a working frequency, and φref,1 is a phase of reflection from an air-glass panel interface.

* * * * *